US009665839B2

(12) United States Patent
Kenna, III et al.

(10) Patent No.: US 9,665,839 B2
(45) Date of Patent: May 30, 2017

(54) NETWORKED ELECTRONIC MEDIA DISTRIBUTION SYSTEM

(71) Applicant: The Marlin Company, Wallingford, CT (US)

(72) Inventors: Frank Kenna, III, Branford, CT (US); Preeti Patel, Norwalk, CT (US)

(73) Assignee: THE MARLIN COMPANY, Wallingford, CT (US)

( * ) Notice: Subject to any disclaimer, the term of this patent is extended or adjusted under 35 U.S.C. 154(b) by 233 days.

(21) Appl. No.: 14/273,860

(22) Filed: May 9, 2014

(65) Prior Publication Data

US 2014/0289157 A1 Sep. 25, 2014

Related U.S. Application Data

(63) Continuation-in-part of application No. 12/723,744, filed on Mar. 15, 2010, now Pat. No. 8,826,168, (Continued)

(51) Int. Cl.
*G06F 3/048* (2013.01)
*G06Q 10/00* (2012.01)
(Continued)

(52) U.S. Cl.
CPC ............ *G06Q 10/06* (2013.01); *G06Q 10/10* (2013.01); *G06Q 30/02* (2013.01); (Continued)

(58) Field of Classification Search
CPC ......... H04M 1/72566; H04M 1/72569; H04M 1/72572; H04W 4/02; H04L 29/08657; G06Q 3/02
(Continued)

(56) References Cited

U.S. PATENT DOCUMENTS 5,621,874 A 4/1997 Lucas et al.
5,872,589 A 2/1999 Morales
(Continued)

OTHER PUBLICATIONS

Yang et al., "InterRing: An Interactive Tool for Visually Navigating and Manupulating Hierarchical Structures", 2002, IEEE Symposium on Information Visualization, pp. 1-8.

*Primary Examiner* — Andrew Joseph Rudy
(74) *Attorney, Agent, or Firm* — Cantor Colburn LLP

(57) ABSTRACT

Generating and presenting electronic media content to employees of a subscriber are provided. An aspect includes a service provider computer having a network connection, a service provider storage accessible by the service provider computer, and software executing on the service provider computer providing a web page allowing a subscriber to log in to the service provider computer. The software provides a plurality of electronic media to the subscriber. The subscriber selects from among the electronic media to generate an electronic media collection that is saved on the service provider storage. The software allows the subscriber to set access to the electronic media collection by a user via the web page, and the software executing on the service provider computer provides a web page allowing a user to log in to the service provider computer. The software identifies the user and presents the electronic media collection to the user.

20 Claims, 7 Drawing Sheets

Related U.S. Application Data which is a continuation of application No. 11/541,160, filed on Sep. 29, 2006, now Pat. No. 7,743,112, which is a continuation-in-part of application No. 11/050,093, filed on Feb. 3, 2005, now Pat. No. 7,765,273, which is a continuation of application No. 09/758,833, filed on Jan. 11, 2001, now abandoned.

(60) Provisional application No. 61/821,910, filed on May 10, 2013.

(51) Int. Cl.
| | | |
|---|---|---|
| *G06Q 10/06* | (2012.01) | |
| *G06Q 10/10* | (2012.01) | |
| *G06Q 30/02* | (2012.01) | |
| *H04L 29/06* | (2006.01) | |
| *H04W 4/02* | (2009.01) | |

(52) U.S. Cl.
CPC ..... *G06Q 30/0272* (2013.01); *H04L 63/0428* (2013.01); *H04L 63/102* (2013.01); *H04W 4/02* (2013.01); *H04L 2463/101* (2013.01)

(58) Field of Classification Search
USPC .......... 715/716, 764, 774; 707/736; 705/344
See application file for complete search history.

(56) References Cited

U.S. PATENT DOCUMENTS

| | | | |
|---|---|---|---|
| 5,889,896 A | 3/1999 | Meshinsky et al. | |
| 5,946,414 A | 8/1999 | Cass et al. | |
| 6,577,329 B1 | 6/2003 | Flickner et al. | |
| 6,721,872 B1 | 4/2004 | Dunlop et al. | |
| 7,050,654 B2 | 5/2006 | Lunetta et al. | |
| 7,062,454 B1 | 6/2006 | Giannini et al. | |
| 7,206,748 B1 | 4/2007 | Gruse et al. | |
| 7,231,371 B1 | 6/2007 | Cantini et al. | |
| 7,240,025 B2 | 7/2007 | Stone et al. | |
| 7,562,339 B2 * | 7/2009 | Racca ....................... G06F 8/34 707/999.001 | |
| 7,578,443 B1 | 8/2009 | Harris | |
| 7,734,475 B2 | 6/2010 | Allan et al. | |
| 7,743,112 B2 | 6/2010 | Kenna, III et al. | |
| 7,765,273 B2 | 7/2010 | Kenna, III et al. | |
| 8,036,668 B2 * | 10/2011 | Panico ................... H04W 16/02 370/342 | |
| 8,060,904 B1 | 11/2011 | Evans et al. | |
| 8,068,986 B1 * | 11/2011 | Shahbazi ............... H04L 63/126 342/28 | |
| 8,073,711 B1 | 12/2011 | McCollum et al. | |
| 8,156,115 B1 * | 4/2012 | Erol ........................ G06T 5/009 382/181 | |
| 8,201,187 B2 * | 6/2012 | Monnie ................... G06F 9/544 709/214 | |
| 8,219,124 B2 * | 7/2012 | Panico .................. H04W 16/18 370/332 | |
| 8,365,094 B2 | 1/2013 | Sato et al. | |
| 8,516,527 B2 * | 8/2013 | Kenna, III ............. G06Q 10/10 235/377 | |
| 8,549,650 B2 * | 10/2013 | Hanson ................. G06F 21/554 713/166 | |
| 8,645,856 B1 | 2/2014 | Burr et al. | |
| 8,739,204 B1 | 5/2014 | Evans et al. | |
| 8,838,504 B2 * | 9/2014 | Eraker ................ G06F 17/3087 705/313 | |
| 8,838,591 B2 * | 9/2014 | Hull ...................... G06F 17/211 707/736 | |
| 9,171,202 B2 * | 10/2015 | Hull ................... G06K 9/00456 | |
| 2001/0051996 A1 | 12/2001 | Cooper et al. | |
| 2004/0230917 A1 | 11/2004 | Bales et al. | |
| 2005/0060647 A1 | 3/2005 | Doan et al. | |
| 2005/0265555 A1 | 12/2005 | Pippuri | |
| 2006/0107218 A1 | 5/2006 | Clark et al. | |
| 2006/0212537 A1 | 9/2006 | Hans et al. | |
| 2006/0286536 A1 | 12/2006 | Mohler et al. | |
| 2007/0113184 A1 | 5/2007 | Haot et al. | |
| 2007/0156841 A1 | 7/2007 | Balakrishnan et al. | |
| 2007/0161402 A1 | 7/2007 | Ng. et al. | |
| 2007/0198930 A1 | 8/2007 | Chu et al. | |
| 2007/0245257 A1 | 10/2007 | Chan et al. | |
| 2007/0266321 A1 | 11/2007 | Bicker et al. | |
| 2007/0294170 A1 | 12/2007 | Vantalon et al. | |
| 2008/0052623 A1 | 2/2008 | Gutfleisch | |
| 2008/0077530 A1 | 3/2008 | Banas et al. | |
| 2008/0109528 A1 | 5/2008 | Knight et al. | |
| 2008/0115178 A1 | 5/2008 | Godin | |
| 2008/0117339 A1 | 5/2008 | Kirsche | |
| 2008/0301749 A1 | 12/2008 | Harrar et al. | |
| 2009/0100339 A1 | 4/2009 | Wharton-Ali et al. | |
| 2010/0175010 A1 | 7/2010 | Jeyabalan et al. | |
| 2010/0175017 A1 | 7/2010 | Kenna, III et al. | |
| 2010/0306195 A1 | 12/2010 | Wagener et al. | |
| 2011/0055767 A1 | 3/2011 | Chen et al. | |
| 2011/0154234 A1 | 6/2011 | Winternitz et al. | |
| 2011/0219433 A1 | 9/2011 | Albrecht-Buehler | |
| 2012/0240194 A1 | 9/2012 | Nack Ngue | |

* cited by examiner

NETWORKED ELECTRONIC MEDIA DISTRIBUTION SYSTEM

CROSS-REFERENCE TO RELATED APPLICATION

This application claims the benefit of U.S. Provisional Application No. 61/821,910, filed on May 10, 2013. This application is a continuation-in-part of U.S. patent application Ser. No. 12/723,744, filed on Mar. 15, 2010, which is a continuation of U.S. patent application Ser. No. 11/541,160 filed on Sep. 29, 2006 (now U.S. Pat. No. 7,743,112), which is a continuation-in-part of U.S. patent application Ser. No. 11/050,093 filed on Feb. 3, 2005 (now U.S. Pat. No. 7,765,273), which is a continuation of U.S. patent application Ser. No. 09/758,833 filed on Jan. 11, 2001.

BACKGROUND

The present disclosure relates generally to employee communication programs, and more particularly, to a method and system for publishing and distributing employee communications to various employees in diverse locations.

Effective communications between management and employees is important for modern business management. Use of a bulletin board upon which printed material, such as, posters including photographs, artwork, designs and/or slogans, and messages, are displayed have been used in the past.

In recent years, systems for presenting electronic communications have been developed that provide significant advantages over known paper systems. For example, U.S. Pat. Nos. 7,765,273 and 7,743,112 both describe a system and method for the distribution of electronic media. These systems provided significant improvements over known communication systems, allowing a user to present electronic communications to employees by assembling a media collection of information and assigning the various media data to be presented at various times. Additionally, these systems allowed a user to select pre-assembled media content generated and provided by the service provider to the subscriber for selection and inclusion in the subscriber's media collection. However, the media collection is transmitted to a controller, which is located, for example, at the subscriber's business location so that employees viewing a display connected to the controller can view the media collection. A limitation of this system is that the employee must be physically present at the subscriber's place of business where the display is located (e.g., in a break room, or on a factory floor, or other location that it can be easily viewed by employees) in order to view the media collection.

In today's business environment, companies have increasingly allowed employees to work from home, or have employees in many diverse locations, whether in or out of the country the business is located in. Even though companies have employees in many diverse locations, it is still desirable to provide employee communications on a diverse number of topics.

Accordingly, it is desired to provide an efficient system that overcomes the deficiencies of prior art systems and services. It is desired to provide a system which provides for remote access and distribution of media content to end users (e.g., employees) located at any geographic location having network connectivity.

SUMMARY

The embodiments provide an employee communications system for generating and transmitting electronic media content from an employer to its employees located within and outside the workplace.

An embodiment includes a system for distribution of electronic media capable of electronically transferring employee communications generated at a provider location to a plurality of remote locations where employees are situated and have access to a networked communication device.

A further embodiment includes a method for distribution of electronic media in which employee communications are efficiently produced at a provider location, customized by a subscriber and delivered to the subscriber in electronic form for display to the subscriber's employees situated at various geographic locations.

A further embodiment includes a system for distribution of electronic media capable of making employee communications generated at a provider location electronically accessible and retrievable by a plurality of networked communication devices.

Another embodiment includes a system for distribution of electronic media capable of making employee communications generated from a mobile terminal at any geographic location electronically accessible and retrievable by a plurality of networked devices at any geographic location.

An additional embodiment includes a system for distribution of electronic media in which employee communications are efficiently produced at a provider location, customized by a subscriber, and delivered to the subscriber in electronic form for display to employees on networked communication devices at any geographic location.

These and other embodiments are achieved by providing an electronic communication distribution system storing media data on a server where the media is accessible by and transmitted to one or more networked communication devices, upon request, for display to employees. Such a system includes a service provider server and/or computer for receiving an electronic media collection and a service provider storage for saving the electronic media collection. The system further allows for a subscriber to access the service provider server via a network connection, wherein the subscriber is allowed to generate the electronic media collection. The service provider server transmits the electronic media collection to a user (e.g., subscriber's employee) that accesses the service provider server via a network connection and which streams the electronic media collection to the user. The electronic media collection may be selected from the group consisting of pre-assembled media content generated and provided by the service provider to the subscriber for selection, modified pre-assembled media content generated by the subscriber, and/or custom generated media content generated for or by the subscriber. The system is provided such that the subscriber selects from among the electronic media to generate the electronic media collection.

A user (networked) communication device includes a device being capable of establishing a connection to the service provider computer via a network, such as the Internet, local area network (LAN), wide area network (WAN), and metropolitan area network (MAN). In some embodiments, the communication device may be a computer, for example, a desktop, laptop, netbook, and tablet. In other embodiments, the communication device is a cellular or mobile device, such as a smart phone and personal digital assistant with wireless adapter. Any type of electronic networked device having a display may be used.

The electronic media collection, in some embodiments, is streamed onto a website/web page where it is made available to any employee of the subscriber with access to that site. Accordingly, any employee with an electronic communication device can simply log onto to the website using a login identification and corresponding password (gaining authorized access and providing information to the service provider computer regarding the type of user and thus the type of media collection to be transmitted and made available to the user) and stream the media collection from the service provider computer. Access control to the website can be by any of the generally known access control methods used in servers. Once authorized access is established, the user communication device, and more specifically a web browser application running on the user communication device, remotely retrieves the electronic media collection from the service provider server for viewing by the subscriber's employee.

In still another embodiment, a method for storing, transmitting and displaying electronic media from a service provider to a subscriber is provided, the method comprising coupling a customer computer to a service provider server/computer via a network connection and generating the electronic media collection to be transmitted to the service provider server. The electronic media collection is selected from the group consisting of: pre-assembled media content generated and provided by the service provider to the subscriber for selection, modified pre-assembled media content generated by the subscriber; and/or custom generated media content created for or by the subscriber. The method further includes the steps of storing the generated electronic media collection in a service provider storage accessible by the service provider server and transmitting the electronic media collection from the service provider server to at least one employee communication device coupleable to the service provider server via a network connection. The method also includes the step of streaming the electronic media collection on a display of the electronic user communication device.

In yet another embodiment, a system for storing, transmitting and displaying electronic media from a service provider to a plurality of subscriber-employee locations is provided having at least two electronic communication devices for receiving first and second electronic media collections respectively, each communication device including at least one display, wherein the displays present the first and second electronic media collections received by the user communication devices. The system further includes a service provider server/computer coupled to the at least two user communication devices via a network connection, the service provider computer transmitting the first and second electronic media collections to the at least two user communication devices, respectively. The system still further includes a service provider storage coupled to the service provider computer for storing the first and second electronic media collections, and a customer computer coupleable to the service provider computer via a network connection for generating the first and second electronic media collections transmitted to the at least two user communication devices. The system is provided such that the at least two electronic communication devices may be positioned at different physical locations and that the subscriber generates the first and second electronic media collections sent to each of the at least two electronic communication devices, respectively.

Other objectives are achieved by providing an electronic communication distribution system having a client computer adapted for retrieving and streaming media content. A web server is capable of communicating with the client computer for transmission of data, thereto, is also provided. The web server along with an application server, which may include one or more machines, communicating with the web server formulates the data for ultimate transmission to the client computer.

It is envisioned that a service provider of the workplace communications may maintain the web server and applications server. The provider may also design and store certain electronic employee communications suitable for a variety of business types, e.g., manufacturing, sales, service, etc. For the electronic employee communications to be distributed and received by a subscriber's employees, the employees may use existing electronic devices that are adapted to establish a communications link to a network. The subscriber provides information about his business to the provider to aid the provider's software in producing pertinent electronic employee communications. The subscriber is granted limited access to the provider's application server to enable the subscriber to choose, alter and/or generate new custom electronic employee communications, which are to be transmitted to the employee communication devices.

In one embodiment, a system is provided that allows for selection of pre-assembled media content, customization of the pre-assembled media content by the subscriber or generation of new media content by the subscriber. In this manner, the subscriber has full control over the media content supplied to the subscriber's employees. It is contemplated that the subscriber may categorize particular media content into collections, e.g., certain media content may be selected to be accessible and streamed on employee/user communication devices for maintenance personnel while other selected media content may be selected to be accessible and streamed on employee communication devices for management personnel. Further, it is contemplated that the media collections distributed to all employee communication devices of maintenance personnel have an identical presentation, or at least present the same media content included in the media collections.

It is further contemplated that the subscriber may generate custom media content for display to its employees, whether by alteration of the pre-assembled media content or generation of entirely new media content.

In another embodiment, it is still contemplated that full customization of the media presentation may be provided to the subscriber, including, for example, the ability to adjust the content and sequence of the media information displayed and the length of time each piece of media streams on the employee/user communication device. In another embodiment, multi-language capability is further provided to the subscriber to be selected as desired.

In one configuration, the electronic communication display system may include two computers, a service provider computer/server and a user communication device at any geographic location having network connectivity. The service provider computer stores electronic employee communications, sorts and keeps track of each subscriber's order. Regardless of the location of the employee, each user communication device includes a computer connected to the Internet, or a network, and having a display monitor. In some embodiments, the employee communication device continuously polls the service provider computer/server and retrieves an updated assortment of employee communications in electronic form, which are then displayed on the communication device's display. The employee communication device may be configured to also show regularly updated news, weather, and sports, or other types of information desired to be shown by the subscriber.

The user communication device may be provided with a web browser configured in display mode for display of the media. The web browser may contain a plurality of channels wherein each of the channels contains an electronic poster or an electronic message.

Another preferred embodiment involves a method of providing customized employee communications in electronic form to a plurality of employee/user communication devices located at various geographic locations and includes the steps of: creating employee communication collections containing several electronic employee communications for each subscriber; posting the employee communication collections on a server connected to the Internet; selectively permitting or excluding the subscriber's employees to access the server and allowing the subscriber to: view one or more of the employee communication collections; alter the content of the one or more employee communication collections by: adding or deleting particular electronic employee communications; modifying the content of one or more electronic employee communications; and/or creating a new electronic employee communication for inclusion in the employee communication collection; storing the employee communication collection in a central location on the service provider server; and streaming the employee communication collection on one or more employee/user communication devices.

As used in this application, the term "deliver" shall be understood to encompass transmitting, downloading and uploading, pushing and pulling (e.g., files), or any combination thereof.

The term "network" as used herein includes both networks and internetworks of all kinds, including the Internet, and is not limited to any particular network or inter-network.

The term "media data" as used herein means data distributed on storage media, or otherwise, without regard to the form or content thereof, and including but not limited to audio, video, text, images, animations, web pages and streaming media data.

The terms "coupled", "coupled to", and "coupled with" as used herein each mean a relationship between or among two or more devices, apparatus, files, programs, media, components, networks, systems, subsystems, and/or means, constituting any one or more of (a) a connection, whether direct or through one or more other devices, apparatus, files, programs, media, components, networks, systems, subsystems, or means, (b) a communications relationship, whether direct or through one or more other devices, apparatus, files, programs, media, components, networks, systems, subsystems, or means, and/or (c) a functional relationship in which the operation of any one or more devices, apparatus, files, programs, media, components, networks, systems, subsystems, or means depends, in whole or in part, on the operation of any one or more others thereof.

Other features and aspects of the invention will become apparent from the following detailed description, taken in conjunction with the accompanying drawings, which illustrate by way of example, the features in accordance with embodiments of the invention. The summary is not intended to limit the scope of the invention, which is defined solely by the claims attached thereto.

DETAILED DESCRIPTION OF THE INVENTION

The following detailed description illustrates the invention by way of example, not by way of limitation of the principles of the invention.

Figure 1:
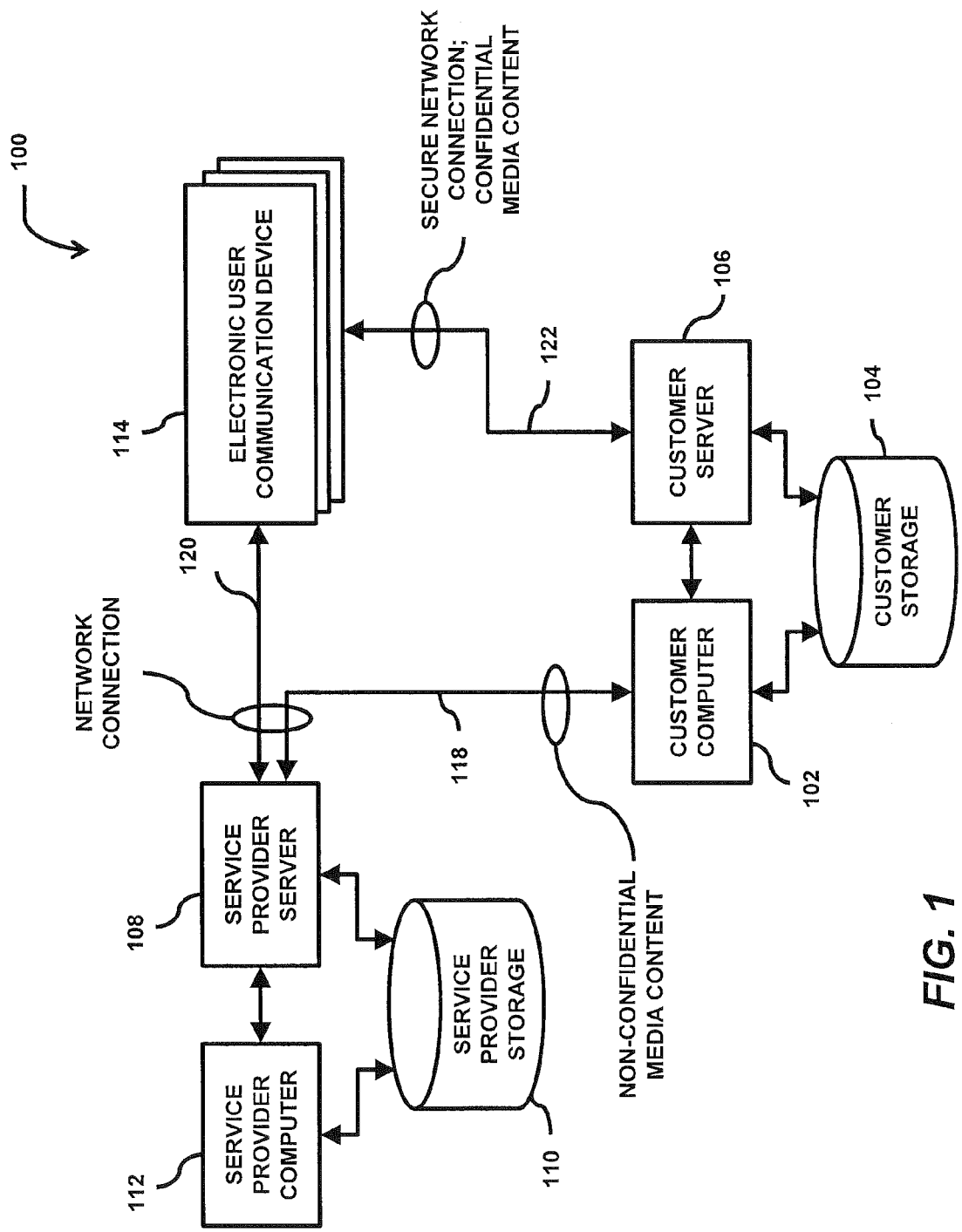
FIG. 1 is a block diagram of one embodiment of the present invention.

Referring to the figures in detail and first to FIG. 1, there is shown an exemplary embodiment of an electronic media distribution system 100. The electronic media distribution system 100 includes a service provider server 108 capable of transmitting and receiving electronic media content to various communication devices at any geographic location having network connectivity. More specifically, in some embodiments, the service provider server is adapted to continuously transmit electronic media content, thereby enabling streaming services. The service provider server 108 is adapted to run one or more services related to granting access and delivering electronic media content to one or more external communication devices (i.e., electronic communication device 114) for display. The service provider server 108 provides any necessary data conversion in order to enable streaming services. For example, the service provider server 108 can encode and/or transcode the electronic media collection in order to configure it into a data format that can be easily and quickly transmitted to one or more electronic communication devices 114 over a network connection 120 with minimal degradation in image quality. Further, the server 108 may provide transrating (converting electronic media collection to a different data rate using the same data format) and transmuxing (converting the electronic media collection to a different container format without change the file contents, i.e., media content) capabilities. In some embodiments, the service provider server 108 compresses the media content into a compressed form prior to transmission over the network connection.

In one embodiment, the service provider server 108, functions as a database server organized to collect electronic media collections and the media content arranged in a specific display format forming each collection. The server 108 also provides data services to other communication devices, such as computers, in a client-server model framework. In another embodiment, the service provider server 108 may be established as a file server dedicated to providing the location of shared storage of media content files, which may be accessed by one or more electronic communication devices 114 that connect to the service provider server 108 via a network connection 120. In still another embodiment, the service provider server 108 may also be a web server which delivers and transmits web-based content (i.e., electronic media collection) to various client devices that can be accessed over the Internet. Further, the server 108 may be formed as an applications server or a real-time communication server adapted to provide live streaming of one or more electronic media collections.

The service provider server 108 may include any kind of processor, processing unit, and/or controller having the capability to receive and transmit data to one or more electronic communication devices positioned at various remote locations, on a continuous or periodic basis that is sufficient for streaming services. In addition, the server 108 may include memory with error detection and correction and redundant disks to ensure smooth, uninterrupted communication of electronic media collections.

The service provider server 108 is coupled to a service provider computer 112 and a service provider storage 110. The service provider computer 112 may be adapted to provide on-location access to the service provider server 108 for administering and configuring the server. For example, the service provider computer may be located within the same room or facilities of the service provider server. This access, to administer and configure the service provider server 108, aids in maintaining the security of the server 108 from inadvertent adjustment or manipulation of its settings and the services the server provides. From the service provider computer 112, an administrator (e.g., employer "subscriber") of the service provider may further monitor and analyze statistics regarding the number of "users" (e.g., subscriber's employees) requesting that an electronic media collection be streamed to their employee communication device 114. Further, the administrator can view the length of time each user spends in viewing the electronic media collection, i.e., how long the service provider server 108 continuously transmits data to the electronic communication device. The service provider storage 110 is coupled to both the service provider server 108 and the service provider computer 112 for storing electronic media content and electronic media collections.

The service provider server 108 includes software executing thereon, which provides a web page allowing a subscriber to log in to the service provider server. The software provides a plurality of electronic media to the subscriber, wherein the subscriber is able to select from among the electronic media to generate an electronic media collection and save the generated electronic media collection on the service provider storage 110. The electronic media collection may be selected from a group consisting of: pre-assembled media content generated and provided by the service provider to the subscriber for selection; modified pre-assembled media content generated by the subscriber; and/or custom generated media content generated by the subscriber. The electronic media collection may be selected from audio, video, text, images, animations, web pages, streaming media data, and/or combinations thereof.

In addition to generating the electronic media collections, the software provides for the subscriber to establish a sequential order in which certain media content is presented. The subscriber may configure the electronic media collections such that certain media content are presented simultaneously in a given display view. Further, the subscriber can set a time limit (e.g., 10 seconds, 20 seconds, 30 seconds) for each media content data to be presented to the user.

The software of the service provider server 108 also provides the subscriber to set access to the electronic media collection by a user (e.g., subscriber's employee) by means of the web page. This feature provides for proper distribution and presentation of electronic media collection based on the user, such as the type of user. In addition, the software executing on the service provider server 108 provides a web page allowing a user to log into the service provider server/computer, such that the software identifies the user and presents the electronic media collection to the user.

In some embodiments, the electronic media collection includes multiple electronic media collections. Accordingly, the software of the service provider server 108 provides a plurality of electronic media to the subscriber, wherein the subscriber is able to select from among the electronic media to generate a plurality of electronic media collections and save the electronic media collections on the service provider storage 110. In one case, the system includes a first electronic media collection and a second electronic media collection. The first electronic media collection is different than the second electronic media collection, for example with respect to the specific media content that is presented, the order in which media content is displayed, and/or the length of time in which media content is displayed. The system 100 is adapted to present either the first or the second electronic media collection to the user based on who the user is, i.e., identification of the user. In another case, the first and second electronic media collection may be the same entirely or have similarities, such as the first and second media collections include similar media content but are organized in different presentation order and/or with different lengths of time for presentation thereof.

In further embodiments, a third electronic media collection may be included in the system 100. The third electronic media collection may be different than either the first or the second electronic media collection. In other cases, the third media collection may be different than both the first and the second electronic media collections. The system 100 presents either the first or the second or the third electronic media collection to the user based on the identification of the user.

In still other embodiments, the system 100 may be configured for generating electronic media collections and presenting the electronic media to users, wherein the software executing on the service provider server 108 provides a web page allowing for multiple users to log into the service provider server. The software identifies a first user of the multiple users and presents a first of a plurality of electronic media collections to the first user as well as identifies a second user of the multiple users and presents a second of the plurality of electronic media collections to the second user. The system is further adapted to accommodate three, four, five, etc., users such that each user is presented an individualized electronic media collection. In some embodiments, the first electronic media collection differs from the second electronic media collection, for example, with respect to the type of media content included in the collection, the order in which media content is presented, and/or the length of time in which each media content is presented. In other embodiments, the first and second electronic media collections may be the same or have similarities (e.g., similar media content, sequential order, length of presentation time).

The electronic communication device 114 may include a computer, such as a desktop, laptop, netbook, tablet, or any other well known computing device. In other embodiments, the employee communication device can be a cellular or mobile device, such a smart phone and personal digital assistant (with wireless adapter). Generally, any type of network-connected electronic device with a display may be used. The one or more electronic communication devices 114 provide access, via the service provider server 108, to the electronic media collection generated by the customer computer 102 and stored on the service provider storage 110. Using a login ID and a password, the electronic communication device transmits user identification information to the service provider server 108 in order for the server 108 to verify that the electronic communication device 114 should be allowed access. As such, the user has to log onto the service provider server in order to gain access to the electronic media collection. The server 108 further utilizes the identification information to determine which electronic media collection is available for playing by the electronic communication device 114 and locates that media collection in the service provider storage 110. Thereafter, the service provider server 108 may continuously transmit the electronic media collection to the communication device 114, via the network connection 120, so that the communication device 114 can begin playing the media collection in a display (in the web browser application). In view of the above, the service provider server 108 manages the transmission of the electronic media collection to the electronic communication devices 114. The electronic communication devices, meanwhile, manage the retrieval and streaming of the media content included in the electronic media collection from the network connection 120 with use of the browser application.

The device 114 uses the web-browser application in order retrieve the web page provided by the software executing on the service provider server 108. Once the user log in to the web page and thus gain access to the service provider server 108, the server transmits the appropriate electronic media collection to the electronic communication device 114. As transmission occurs, the electronic communication device begins to stream the media content included in the electronic media collection. Accordingly, the media collection and the media content therein are constantly received by and presented on the device 114 to the user (i.e., employee). The electronic communication device 114 can start playing the media collection immediately before the "entire" media file has been transmitted. Furthermore, given that the electronic media distribution system 100 is adapted to provide up-to-date information to a subscriber's employees, the electronic media collection may be updated on a continuous basis, or at least periodically. As such, by streaming the electronic media collection, important and/or relevant information may be quickly "pushed" to the electronic communication device 114 for immediate display to the user. The software executing on the service provider server provides for one or more of the electronic media collections to be updated, such that the updated electronic media collections are automatically presented to the user(s) already logged in to the service provider server. For example, the display (see FIG. 5) in which the electronic media collection is streamed includes a quick ticker 268 which may show real-time text or streaming text.

To support streaming of the electronic media collection, the network connection 120 includes a protocol framework which supports streaming media. For example, the network connection 120 may utilize datagram protocols, sending media stream as a series of small packets. Another example of a streaming protocol which the network connection 120 may be designed with is a real-time streaming protocol. In some embodiments, the network connection 120 includes a reliable transmission control protocol, which provides for reliable and correct delivery of each bit of a media stream. In other embodiments, a unicast or multicast protocol may be used in the network connection 120. Still further, the network connection 120 may include an IP multicast framework, wherein a single electronic media collection is streamed to a group of electronic communication devices 114 (where the employees using those devices have been configured to receive the same electronic communication collection).

In some embodiments of the system 100, the electronic communication device 114 may query the service provider server 108 for an electronic media collection to run on its display monitor. For example, the communication device 114 may query the service provider server 108 at a period time interval, e.g., 5 minutes, 10 minutes, 15 minutes, in order to verify that the most current and/or updated electronic media collection is being transmitted to the communication device 114. In some situations, the automatic query function may provide a diagnostic tool for the system 100. For example, if the electronic communication device, after having initially established a network connection 120 with the service provider server 108, does not query the service provider server 108 within a certain time frame, the system 100 may provide an alert to the service provider or the subscriber regarding such. In another example, the service provider server 108 may cease transmitting the electronic media collection if it does not receive a query within a certain time period. This helps to ensure that the electronic media collection is not being transmitted incorrectly to some other device that is not associated with the electronic media distribution system.

Since the electronic communication device 114 displays the electronic media collection in a streaming format, the device does not require a storage unit, or at least a substantial storage size to download and save the electronic media collection. However, in some embodiments, the device 114 may include a storage unit to save a backup copy of the electronic media collection. With a saved copy of the media collection, the device 114 can continue to play media content even if the network connection 120 fails and communication with the service provider server 108 is interrupted. Accordingly, the electronic communication device 114 can continue to play the electronic media collection until the network connection 120 is re-established. The display of the electronic media collection, therefore, should provide a steady transition between streaming the electronic media collection from the server 108 to/from playing the electronic media collection using a saved copy thereof stored in the storage unit of the electronic communication device 114.

Figure 5:
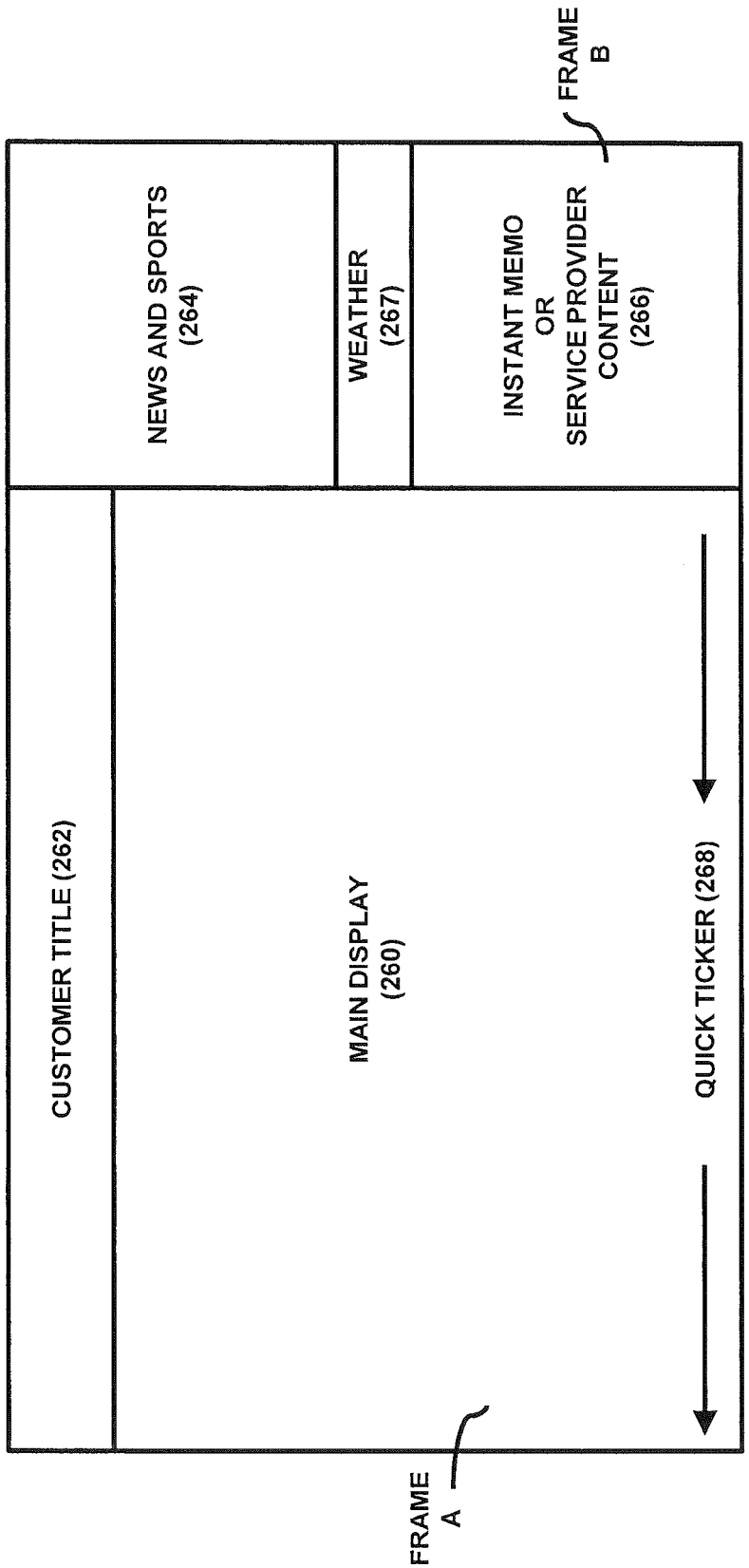
FIG. 5 is an annotated diagram of a representative electronic display according to FIGS. 1-2.

The electronic communication device 114 also includes a display monitor for electronically displaying the media collection in the display format as shown in FIG. 5. In some embodiments, the electronic display is integrated with the employee communication device 114 as a single unit (e.g., laptop, netbook, tablet, cellular device, pda). However, in other embodiments, the display monitor is connected to the employee communication device, as is the case with a desktop.

The electronic distribution system 100 further includes at least one customer computer 102 coupleable to the service provider server 108 via a network connection 118. The customer computer 102 is adapted to allow a subscriber to generate one or more electronic media collections for transmission to the service provider server 108 and subsequently shared to at least one electronic communication device 114 for display. In particular, through the customer computer, the software executing on the service provider server allows the subscriber to gain access (e.g., limited access) to the system for making configurations related to the electronic media collections. For example, via the customer computer, the software allows the subscriber to set access to the electronic media collection by user via the web page. A customer storage 104 is coupled to the customer computer 102 and is adapted to save any electronic media collection generated by the customer computer 102 as well as certain media content (discussed in further detail below).

From the customer computer 102, a subscriber is able to access a variety of media content provided by the service provider to the subscriber. For example, the subscriber is provided with pre-assembled media content generated and provided by the service provider. This pre-assembled media content includes media information the service provider has assembled and is believed would be of interest to the subscriber. The service provider may, further suggest certain media content to the subscriber, which the subscriber may or may not select for display to its employees. In addition, the service provider may continually update the pre-assembled media content to provide fresh information to the subscriber so as to keep employees interested in the displayed information.

Figure 6:
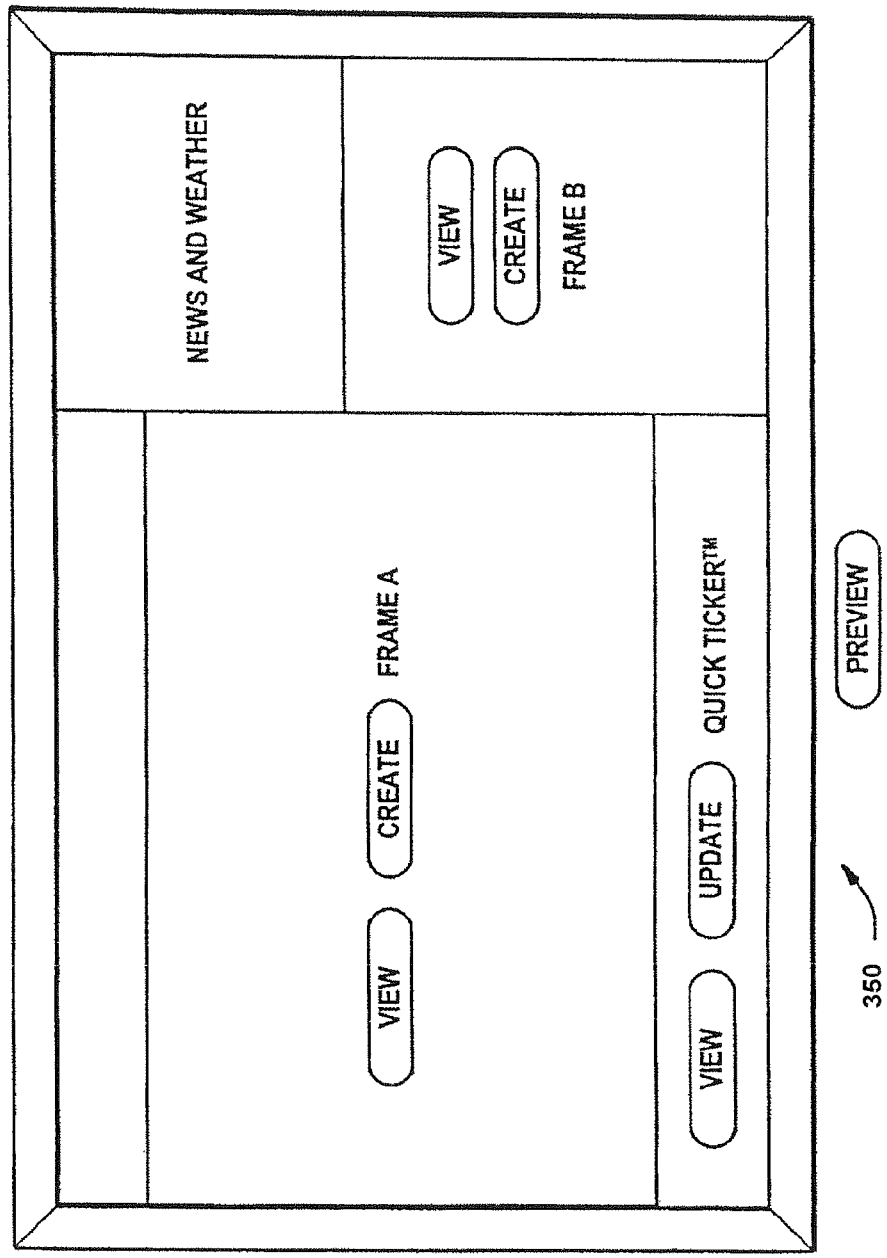
FIG. 6 is a representative screen generated by application software, which a subscriber may use in connection with the apparatus and method of FIGS. 1-2.

Also provided for the subscriber is the ability to modify the pre-assembled media content. For example, the subscriber may wish to present some of the pre-assembled media content to its employees with some minor changes particular, for instance, to the site location. The subscriber may select the pre-assembled media content and, by means of editing tools in the system software (e.g., FIG. 6), may modify the pre-assembled media content as desired. This may include, adding new content to the pre-assembled media content, deleting certain media content, rearranging the media content including altering the size, look and feel of the media content, altering the play time or play order for certain media content and so forth.

Still further, the subscriber may wish to generate entirely new media content completely unrelated to any of the pre-assembled media content. Again, the subscriber is provided with the tools to be able to compile virtually any information or data desired to be transmitted and streamed on the one or more electronic communication devices 114.

Once the subscriber has viewed, modified and/or generated the media content to be displayed, the subscriber may compile an electronic media collection, which includes all the information that the subscriber desires to be accessible to, transmitted to, and streamed on the electronic communication device 114. The subscriber may further assemble the media content to play in a desired play order including selecting the length of time each segment of information will be displayed on the electronic communication device 114.

The electronic media collection may, in one embodiment, be stored on the service provider storage 110. In this manner, a subscriber may access and select certain pre-assembled media content and save an electronic media collection on service provider storage 110. In addition, the subscriber may access and modify certain pre-assembled media content and save the modified content in the electronic media collection. Still further, the subscriber may generate completely new media content, which may also be saved in the electronic media collection on service provider storage 110. While the subscriber may, at their choice, modify and/or generate their own media content, the subscriber may simply use the pre-assembled media content. The subscriber can set up the system to automatically update the electronic media collection with new pre-assembled media content as such becomes available. Alternatively, the subscriber may set the system up to provide the subscriber with a notification that new pre-assembled media content for the subscriber's review and authorization to play. Still further, the subscriber may set the system up such that the electronic media collection can only be updated manually. As can be seen, a maximum amount of control is provided to the subscriber for generation, modification and display of media content.

The customer computer 102 provides a subscriber the capability to manage which users may access the service provider server 108 through an electronic communication device 114 and request transmission of an electronic media collection. For example, the customer computer 102 is adapted to add or remove users who may remotely access the service provider server 108 to stream electronic media collection. In addition, the customer computer 102 provides means for identifying which users (and the electronic communication device 114 being used to access the service provider server 108) may view which particular electronic media collection. That is, the customer computer provides for defining which specific electronic media collection stored on the service provider storage 110 may be streamed by a specific user/electronic communication device 114.

Further, the customer computer 102 may be adapted to provide statistical snapshots of user activity. The customer computer can show which users (i.e., subscriber's employees) are currently viewing electronic media collections using electronic communications devices 114. It can also show the number of users who viewed electronic media collections in the past and their log-in time (e.g., length of time user spent streaming electronic media collection). The customer computer 102 is also adapted to generate a report which documents a variety of information regarding user activity, such as the particular electronic media collection that is available for viewing by a user.

While FIG. 1 has been discussed in connection with only one electronic communication device 114, it is contemplated that there may be multiple electronic communication devices 114 that are located at any geographic location having network connectivity and that are adapted to couple with the service provider server 108. The subscriber is given maximum control of the media content provided to the various displays as described above. For example, the subscriber may wish to present certain media content to all maintenance personnel in the various complexes in various geographic locations, the subscriber may assemble a media collection and assign the collection to a particular group of users (identified by the user's login). Alternatively, the subscriber may want to provide different information to management personnel who are operating an electronic communication device 114. The system 100 allows for the full customization of content, while at the same time, allowing the subscriber to associate collections with particular groups to facilitate ease of directing the media content to the correct electronic communication devices 114. In addition, the system 100 incorporating electronic communication devices 114 ensures that the subscriber's employees have access to employee/business information regardless if they are not present in the workplace (e.g., employees on travel).

Figure 7:
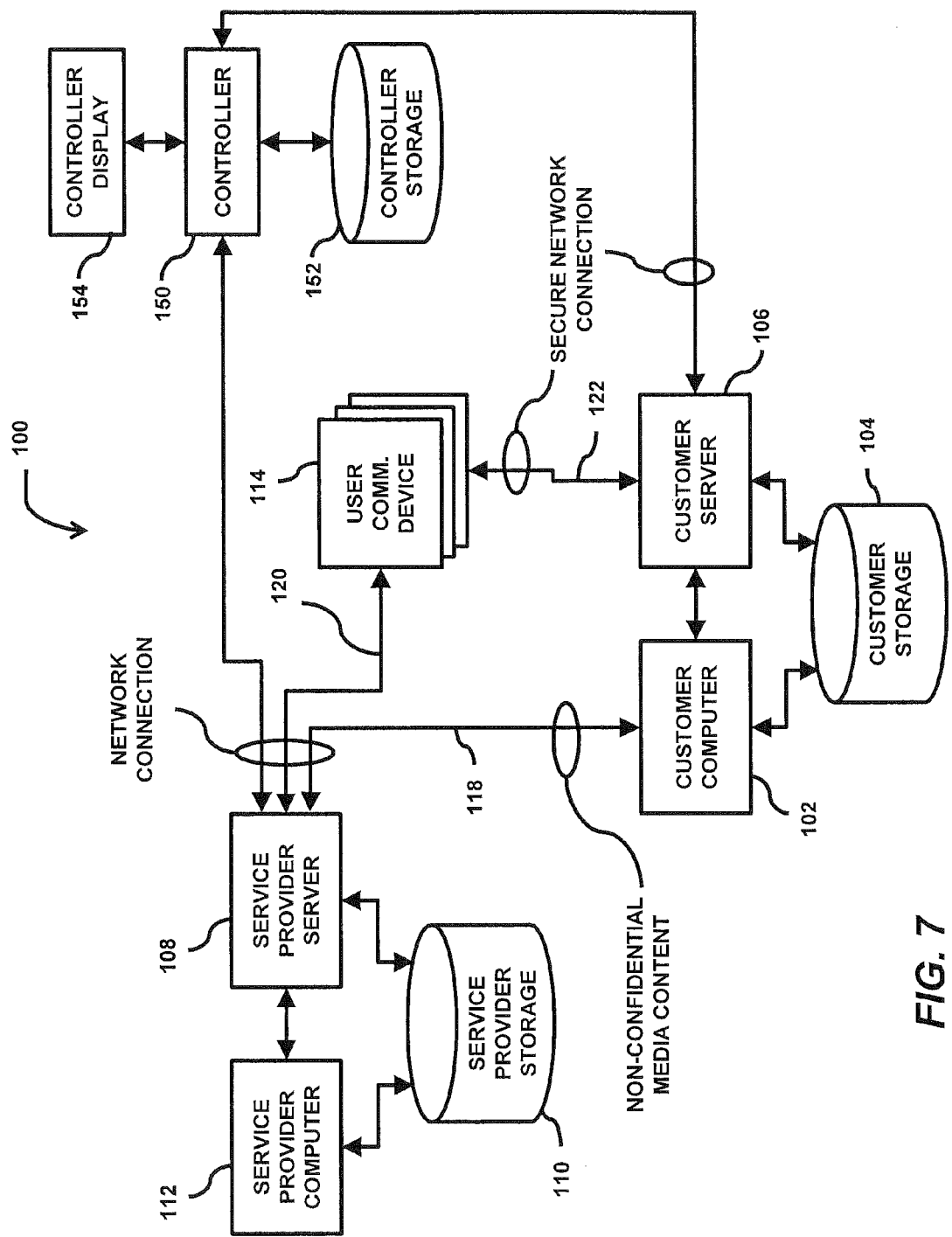
FIG. 7 is a block diagram of another embodiment of the present invention.

The system 100 may further include a controller 150 having a controller storage 152, and a display 154 coupled to the controller, wherein the electronic media collection is transmitted from the service provider server 108 to the controller and presented on the display (see FIG. 7).

A method associated for generating an electronic media collection and presenting electronic media to one or more users, using for example the system 100, is provided. Such method includes the steps of: connecting a service provider computer 108 having a service provider computer storage 110 to a network; presenting a web page to a subscriber when the subscriber navigates to the web page address, wherein the web page allows the subscriber to log onto the web page; presenting a plurality of electronic media to the subscriber, wherein the subscriber selects from among the electronic media; generating an electronic media collection based on the electronic media selected by the subscriber, wherein the electronic media is selected from the group consisting of pre-assembled media content generated and provided by the service provider to the subscriber for selection, modified pre-assembled media content generated by the subscriber; and/or custom generated media content generated by the subscriber; saving the electronic media collection on the service provider computer storage; setting an authorization for a user to access the electronic media collection via the web page; identifying a user that logs on to the web page; and presenting the electronic media collection to the user.

In some embodiments of the method, the software allows the subscriber to set the authorization for the user. Further, the method may involves storing information relating to the user accessing the electronic media collection. The information stored may be selected from a group consisting of: a time and date for each time the user accesses the electronic media collection, a length of time for each time the user accesses the electronic media collection, and combinations thereof.

The method may further include the step of setting a sequential order and time limit for each media data to be presented to the user.

In some embodiments, the method also includes: providing a controller 150 having a controller storage 152; providing a display 154 coupled to the controller 150; transmitting the electronic media collection from the service provider server 108 to the controller; and presenting the electronic media collection on the display (see FIG. 7).

Figure 2:
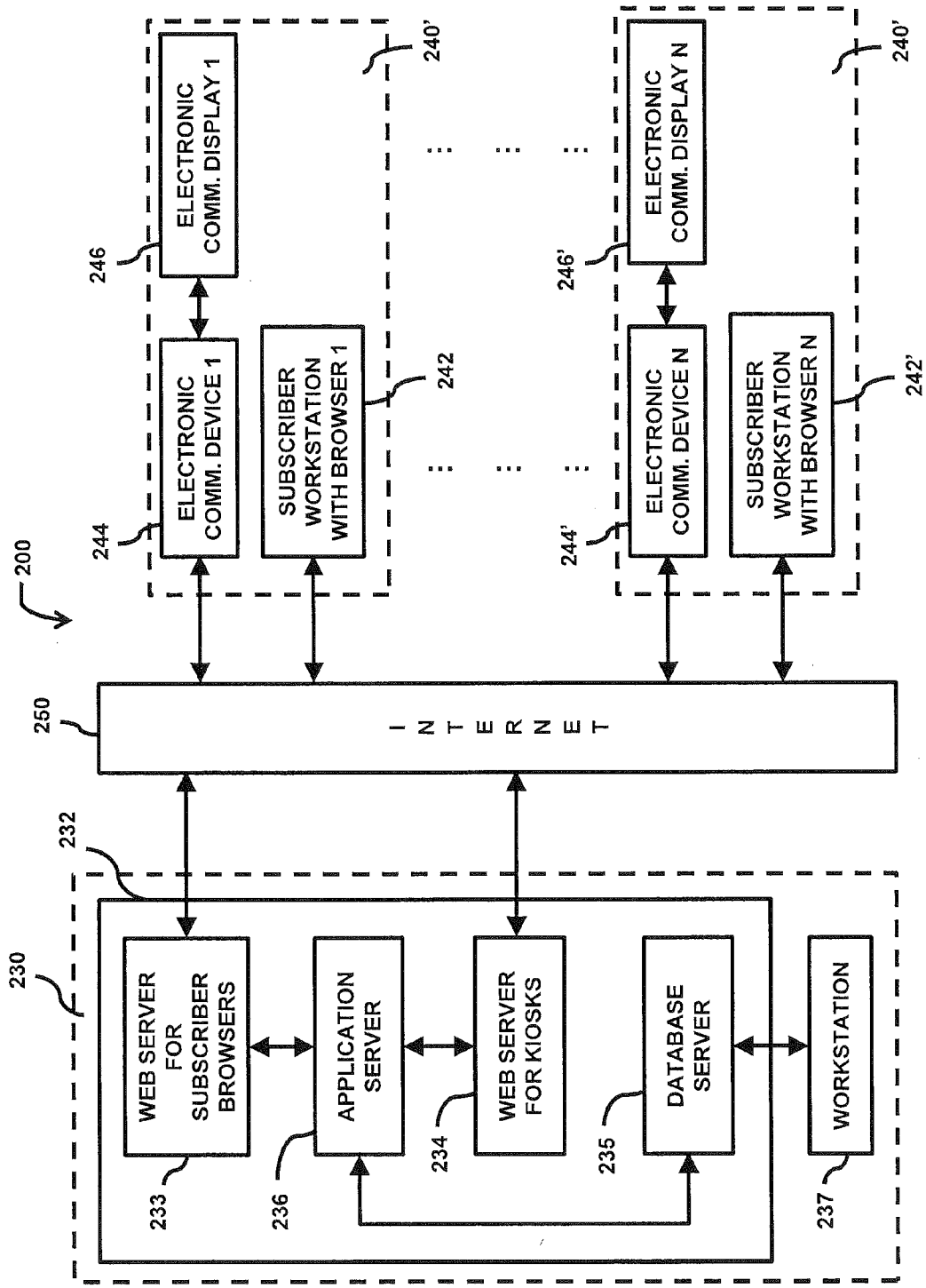
FIG. 2 is a block diagram of another embodiment of the present invention.

Another embodiment of an apparatus for distribution of electronic media according to the present invention is schematically illustrated in FIG. 2 and generally designated by the numeral 200. The apparatus for distribution of electronic media 200 facilitates electronic transmission and distribution of employee communications from a primary location to one or more remote employee locations. The employee communications may take the form of a "poster" as that term is commonly understood, where the poster is created and maintained in electronic form. A typical electronic poster or media collection may include text and graphics arranged to be visually attractive and convey information pertinent to a subscriber's business, workplace or employees. The subject matter of the employee communications may involve safety, quality, teamwork, morale, self motivation, subscriber news releases, employee activities and the like.

The term "employee communication" as used herein is intended to include all forms of visual communication including graphics, written and printed text along with photographs, visual works and artistic material displayed either alone or in any combination. Particular employee communications may take the form of an electronic media collection or poster as described above and further include video and audio presentations.

The apparatus for distribution of electronic media 200 includes a main server system 230 located at a primary location and a multiplicity of client or subscriber communication subsystems 240, 240', wherein each subsystem includes a subscriber workstation 242 as well as an electronic communication device 244 with its display monitor 246 located at each remote employee location. The subscriber subsystems 240, 240' communicate with the main server system 230 via, for example, an Internet connection 250, or other suitable communications pathway.

The main server system 230 includes a computer 232 configured to function as a first web server 233, a second web server 234, a database server 235, and an application server 236. While the main server system 230 is described in terms of several services and server functions, a single computer 232 may be configured to provide all functions and incorporate all described services. Computer 232 may be connected to the Internet connection 250 in a well-known manner. The first web server 233 is configured to be accessible by one or more subscriber work stations 242, 242' to allow subscribers to modify the content of the employee communications.

The second web server 234 may be similar to web server 233 although modified to communicate via with one or more electronic communication devices 244, 244'. It will be understood that while two web servers 233 and 234 are provided, one web server performing both functions may be employed instead.

The database server 235 may be used to store subscriber information such as subscriber identification, business type, routing information and media data such as employee communication collections developed at a workstation 237 and as modified by the application server 236.

The application server 236 communicates with both the first and second web servers 233, 234 and with the database server 235. The application server 236 provides coordination between the web servers 233 and 234 and allows access to the electronic media collections contained in database server 235. The application server 236 includes application software that tracks and distributes content according to subscriber data and as modified by subscribers according to the method of the present invention.

The client subsystem 240, 240' includes an electronic communication device 244, 244' connected to or integrated with a display monitor 246, 246', respectively. The client/subscriber workstation 242, 242" communicates with the web server 233 via the Internet connection 250. The client workstation 242, 242' preferably includes a web browser. The client work station 242, 242' interactively communicates with web server 233 to transmit subscriber input, for example, to modify an employee communication collection (alternatively referred to as electronic media collections) and receive an updated version of the employee communication collection.

The electronic communication device 244, 244' receives employee communication collections in the form of data in a particular format, for display on display monitor 246, 246'. The electronic communication device 244, 244' communicates with the web server 233 via the Internet connection 250. The electronic communication device 244, 244' preferably includes a web browser, which may be configured in a display mode whereby the browser receives data from the web server 233 and generates a continuous display. In particular, it will be understood that a number of channels of the web browser may be used to simultaneously display various elements of the employee communications collection for varying amounts of time.

Upon receiving employee communication collections (i.e., electronic media collections), the electronic communication device 244, 244' streams them on the display 246, 246', respectively. Preferably, the electronic display 246, 246' may include a plurality of sections for displaying different materials (FIG. 5). For example, as seen in FIG. 5, four separate sections 260, 262, 264 and 266 may be provided—each of which may be functioning simultaneously and at different update times and periods. Each section may sequentially display varying messages and/or visual media content, slogans, etc. For example, in section 260 (Frame A) audio/visual electronic media content may be played or shown for a specified time period, e.g. fifteen (15) minutes, and then switch to custom executive media content. Section 266 (Frame B) may display, concurrently with the employee communications displayed on section 260, an employee communication, then switch to Good Will Motivator™ media content and thereafter switch, for example, to a management suggested letter. The relative timing may also be selected. For example, the messages may alternate every fifteen (15) minutes and may start seven and one half (7.5) minutes after the electronic media content is initially displayed in section 260. Section 264 may display news or announcements such as news headlines, sports scores and may be additionally split into a subsection 267 for display of local current and/or 3 or 5-day weather forecasts. The display 246, 246' may include media such as a client's name or trademark, etc. as illustrated at customer title 262, which may be permanently affixed thereto. It is noted that the recited time lengths can vary within the system, thereby providing flexibility in how information (i.e., media content) is communicated to the subscriber's employees.

Figure 3:
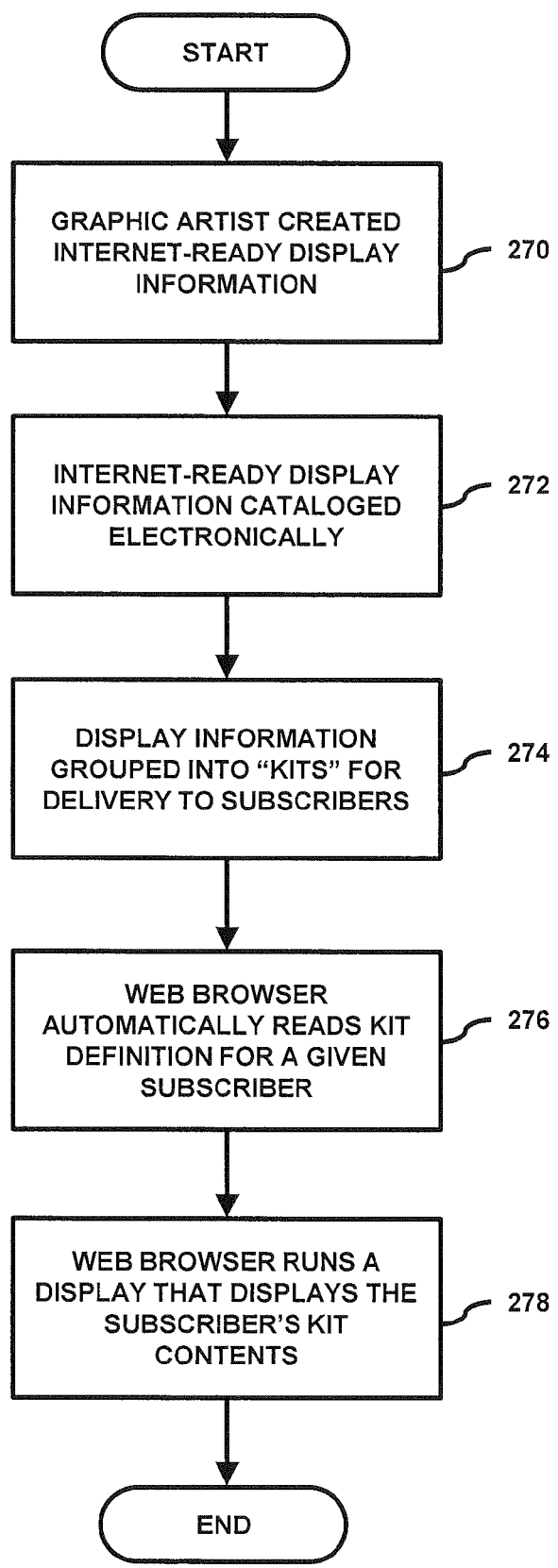
FIG. 3 is a partial flow diagram for a method of distributing electronic media according to the system of FIG. 2.
Figure 4:
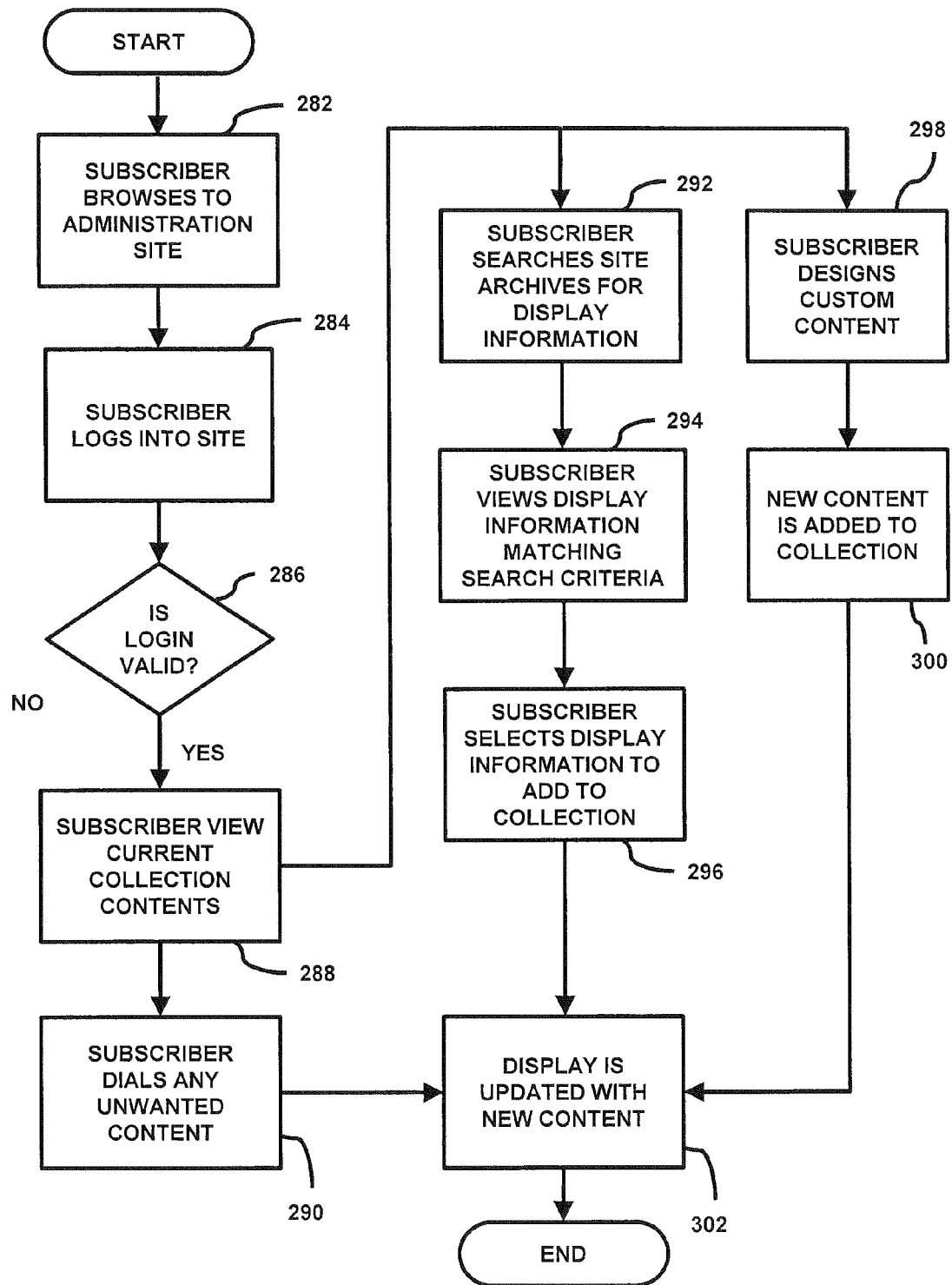
FIG. 4 is a partial flow diagram for a method of distributing electronic media according to the systems of FIGS. 1-2.

Operation. With reference to FIGS. 2, 3 and 4, a graphic artist using work station 237 creates an employee communication in electronic form that is compiled into an employee communications collection in a data format, as discussed above, that is suitable for transmission over the Internet as shown at 270 (FIG. 3). The electronic employee communications are cataloged and stored in the database server 235 at 272 (FIG. 3).

The application server 236 and workstation 237 function to group electronic employee communications by topic and edition. The electronic employee communications may also be compiled into employee communications collections (electronic media collections) arranged by, for example, a particular subscriber or subscriber type such as retail or manufacturing subscribers at 274 (FIG. 3). For example, the subscribers of systems 240 may have access only to one set of electronic media collections while the subscriber of system 240' has access only to a different set of electronic media collections. The application server 236 is also configured to indicate the last time and date that revisions or updates have been made to the employee communication collections.

Each subscriber may modify these collections using a subscriber workstation 242, 242'. The subscriber may select specific electronic employee communications (electronic media collections) for display. Thereafter, the electronic communication devices 244, 244' communicate the electronic employee communications to their respective displays 246, 246' at 276 (FIG. 3), as described above, for display at 278 (FIG. 3). The subscriber can query through the web browser to determine the latest times and dates of electronic media collection changes.

The subscriber may also modify the contents of an employee communication collection as follows. Using a subscriber workstation 242, 242', the subscriber contacts the web server 233 (see, 282 and 284 of FIG. 4) and logs onto the web server 233. After checking for proper password and client login ID at 286, the subscriber is allowed to view the current employee communication collection contents at 288. The subscriber may then choose between different options. The subscriber may search for electronic employee communications by topic, for example, electronic media content with themes such as safety, attitude, cooperation, etc. The subscriber may further remove any unwanted visual electronic media content or other content at 290. The subscriber may also search, using the application server 236, to select particular electronic media content or display information and add the selected media content to the employee communications collection at 292, 294 and 296. The subscriber may have access to various screens such as screen 350 (FIG. 6) to facilitate the search and selection. Optionally, the subscriber may design its own electronic media content within the application or simply provide electronic material for display, all of which may be added to the employee communications collection at 298 and 300. Once a subscriber has completed the modification, the application server 236 makes the updated employee communications collection available. Accordingly, when the electronic communication device 244, 244' polls the web server 233, new media data is streamed for display on the display monitor 246, 246' as shown at 302 (FIG. 4.)

Although the invention has been described with reference to particular arrangement of parts, features, and the like, these are not intended to exhaust all possible arrangements or features, and indeed many modifications and variations will be ascertainable to those of skill in the art.

What is claimed is:

1. A system for generating an electronic media collection and presenting the electronic media to a user, the system comprising:

a service provider computer having a network connection;

a service provider storage accessible by said service provider computer;

software executing on said service provider computer providing a web page allowing a subscriber to log in to said service provider computer;

said software providing a plurality of electronic media to the subscriber, wherein the subscriber selects from among the electronic media to generate an electronic media collection that is saved on said service provider storage, wherein said electronic media collection is selected from the group consisting of:

pre-assembled media content generated and provided by the service provider to the subscriber for selection;

modified pre-assembled media content generated by the subscriber; and/or custom generated media content generated by the subscriber;

said software allowing the subscriber to set access to said electronic media collection by a user via the web page;

said software executing on said service provider computer providing a web page allowing a user to log in to said service provider computer, wherein said software identifies the user and presents said electronic media collection to said user; and said software configured to display, on a user device, statistical snapshots of user activity, the user activity corresponding to current viewing of said electronic media collection.

2. The system according to claim 1, wherein said electronic media collection includes a first electronic media collection, said system further comprising a second electronic media collection, wherein the first electronic media collection is different than the second electronic media collection, and said system presents either the first or the second electronic media collection to the user based on the identification of the user.

3. The system according to claim 2, further comprising a third electronic media collection, wherein the third electronic media collection is different than either the first or the second electronic media collection, and said system presents either the first or the second or the third electronic media collection to the user based on the identification of the user.

4. The system according to claim 1, wherein the user logs onto the service provider computer with a mobile device.

5. The system according to claim 4, wherein the mobile device comprises a smart phone.

6. The system according to claim 1, wherein said electronic media collection is selected from the group consisting of: audio, video, text, images, animations, web pages, streaming media data and combinations thereof.

7. The system according to claim 6, wherein said subscriber sets a sequential order and time limit for each media data to be presented to the user.

8. The system according to claim 1, further comprising a controller having a controller storage, and a display coupled to said controller, wherein the electronic media collection is transmitted from said service provider computer to said controller and presented on said display.

9. A system for generating electronic media collections and presenting the electronic media to users, the system comprising:
a service provider computer having a network connection;
a service provider storage accessible by said service provider computer;
software executing on said service provider computer providing a web page allowing a subscriber to log in to said service provider computer;
said software providing a plurality of electronic media to the subscriber, wherein the subscriber selects from among the electronic media to generate multiple electronic media collections that are saved on said service provider storage, wherein each electronic media collection is selected from the group consisting of:
pre-assembled media content generated and provided by the service provider to the subscriber for selection;
modified pre-assembled media content generated by the subscriber; and/or
custom generated media content generated by the subscriber;
said software allowing the subscriber to set access to said electronic media collections by users via the web page;
said software executing on said service provider computer providing a web page allowing said users to log in to said service provider computer, wherein said software identifies a first user of said users and presents a first of said electronic media collections to said first user and wherein said software identifies a second user of said users and presents a second of said electronic media collections to said second user; and
said software configured to display, on a user device, statistical snapshots of user activity, the user activity corresponding to current viewing of said electronic media collection.

10. The system according to claim 9, wherein said first electronic media collection is different than the second electronic media collection.

11. The system according to claim 9, wherein said software provides for one or more of said electronic media collections to be updated, said updated electronic media collections are automatically presented to said users logged in to said service provider computer.

12. A method for generating an electronic media collection and presenting the electronic media to a user, the method comprising the steps of:
connecting a service provider computer having a service provider computer storage to a network;
presenting a web page to a subscriber when the subscriber navigates to the web page address, the web page allowing the subscriber to log onto the web page;
presenting a plurality of electronic media to the subscriber, wherein the subscriber selects from among the electronic media;
generating an electronic media collection based on the electronic media selected by the subscriber, wherein the electronic media is selected from the group consisting of: pre-assembled media content generated and provided by the service provider to the subscriber for selection;
modified pre-assembled media content generated by the subscriber; and/or custom generated media content generated by the subscriber; saving the electronic media collection on the service provider computer storage; setting an authorization for a user to access the electronic media collection via the web page;
identifying a user that logs on to the web page; presenting the electronic media collection to the user, and
displaying, on a user device, statistical snapshots of user activity, the user activity corresponding to current viewing of said electronic media collection.

13. The method according to claim 12, wherein the software allows the subscriber to set the authorization for the user.

14. The method according to claim 12, wherein the electronic media collection comprises a first electronic media collection, and the method further comprises the steps of:
generating a second electronic media collection, wherein the first electronic media collection is different than the second electronic media collection; and
presenting either the first or the second electronic media collection to the user based on the identification of the user.

15. The method according to claim 14, further comprising the steps of:
generating a third electronic media collection, wherein the third electronic media collection is different than either the first or the second electronic media collection; and
presenting either the first or the second or the third electronic media collection to the user based on the identification of the user.

16. The method according to claim 12, wherein the electronic media collection is selected from the group consisting of: audio, video, text, images, animations, web pages, streaming media data and combinations thereof.

17. The method according to claim 16, further comprising the step of setting a sequential order and time limit for each media data to be presented to the user.

18. The method according to claim 12, further comprising the steps of:
providing a controller having a controller storage;
providing a display coupled to the controller;
transmitting the electronic media collection from said service provider computer to the controller; and
presenting the electronic media collection on the display.

19. The method according to claim 12, further comprising the step of storing information relating to the user accessing the electronic media collection.

20. The method according to claim 19, wherein the information is selected from the group consisting of: a time and date for each time the user accesses the electronic media collection, a length of time for each time the user accesses the electronic media collection, and combinations thereof.

\* \* \* \* \*